(12) United States Patent
Agrawal et al.

(10) Patent No.: US 11,394,251 B2
(45) Date of Patent: Jul. 19, 2022

(54) WIRELESS POWER SYSTEM

(71) Applicant: Renesas Electronics America Inc., Milpitas, CA (US)

(72) Inventors: Pooja Agrawal, Milpitas, CA (US); Adnan Dzebic, San Jose, CA (US); Tao Qi, San Diego, CA (US); Steve Jaycox, Sunnyvale, CA (US); Chan Young Jeong, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/073,699

(22) Filed: Oct. 19, 2020

(65) Prior Publication Data
US 2021/0143688 A1 May 13, 2021

Related U.S. Application Data

(60) Provisional application No. 62/933,855, filed on Nov. 11, 2019.

(51) Int. Cl.
*H02J 50/80* (2016.01)
*H02J 7/00* (2006.01)
*H02J 50/10* (2016.01)

(52) U.S. Cl.
CPC ............ *H02J 50/80* (2016.02); *H02J 7/0071* (2020.01); *H02J 50/10* (2016.02); *H02J 2310/22* (2020.01)

(58) Field of Classification Search
None
See application file for complete search history.

(56) References Cited

U.S. PATENT DOCUMENTS

| | | | | |
|---|---|---|---|---|
| 2015/0044964 A1* | 2/2015 | Khan | ................... | G06F 1/3278 455/41.1 |
| 2015/0372493 A1* | 12/2015 | Sankar | ................ | H02J 7/00308 307/104 |
| 2018/0013314 A1* | 1/2018 | Liu | ........................ | H02J 7/0072 |
| 2019/0386525 A1* | 12/2019 | Smith | ..................... | H02J 50/90 |

\* cited by examiner

*Primary Examiner* — Daniel Kessie
(74) *Attorney, Agent, or Firm* — Haynes and Boone, LLP

(57) ABSTRACT

A method of over-current protection in a wireless power receiver operating in a high-power mode includes digitally receiving an output current signal, generating an OC INT signal if the output current signal is greater than a current limit value, and if the OC INT signal is generated, transmitting Count A number of End Power Transfer (EPT) packets. If wireless power transmission has not stopped, transmitting Count C number of Control Error Packets (CEPs) with Value B. If wireless power transmission has not reduced such that the output current IL is below the current limit value, then enabling an LDO current limit circuit in a power block of the wireless power receiver. In a low-power mode, the receiver enables a hardware over-current circuit that generates an OC INT signal when the output current exceeds a current limit.

27 Claims, 3 Drawing Sheets

WIRELESS POWER SYSTEM

RELATED APPLICATION

The present application claims priority to U.S. Provisional Application Ser. No. 62/933,855, filed on Nov. 11, 2019, which is herein incorporated by reference in its entirety.

TECHNICAL FIELD

Embodiments of the present invention are related wireless transmission of power and, in particular, to current limiting in a high-power wireless power system.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There is also a need for higher powered wireless power systems. High-power systems may result in higher currents and voltages, which may result in higher heating and damage to itself and loads attached to the system due to high currents, high voltages, and high temperatures. Heating can result in damage to the wireless devices involved. There is further additional difficulty in controlling the power in overvoltage and overcurrent conditions in higher power systems, resulting in more complex systems that may not react fast enough to protect the devices involved.

Therefore, there is a need to develop better wireless power receivers with better over-current handling.

SUMMARY

According to some embodiments, a wireless power system is provided that operates in a high-power mode. A method of over-current protection in a wireless power receiver operating in a high power mode includes receiving an output current signal from an analog-to-digital converter; comparing the output current signal with a current limit value; generating an OC INT signal if the output current signal is greater than the current limit value; and if the OC INT signal is generated, transmitting Count A number of End Power Transfer (EPT) packets. The method further includes determining whether wireless power transmission has stopped; and if wireless power transmission has not stopped, transmitting Count C number of Control Error Packets (CEPs) with Value B. The method further includes if wireless power transmission has not reduced such that the output current IL is below the current limit value, then enabling an LDO current limit circuit in a power block of the wireless power receiver. In a low-power mode, the receiver enables a hardware over-current circuit that generates an OC INT signal when the output current exceeds a current limit.

A wireless power receiver according to some embodiments includes a rectifier receiving power from a receiver coil and producing a rectified voltage; a power block coupled to receive the rectified voltage and provide an output voltage, the power block further providing an output current IL; an amplitude shift key (ASK) modulator coupled to transmit digital data packets on the power on the receiver coil; an analog-to-digital converter coupled to provide a digitized output current IL from the output current IL; and a processor coupled to control the rectifier and the power block, coupled to transmit data packets through the ASK modulator, and coupled to receive the digitized output current IL, the processor executing instructions to, in a high-power mode, compare the digitized output current IL with a current limit value, generate an OC INT signal if the output current signal is greater than the current limit value, and transmit Count A number of End Power Transfer (EPT) packets if the OC INT signal is generated. The processor further executes instructions to transmit Count C number of Control Error Packets (CEPs) with Value B if wireless power transmission has not stopped. The processor further executes instructions to enable an LDO limit circuit in the power block if wireless power transmission has not reduced such that the output current IL is below the current limit value. The wireless power receiver further includes a hardware over-current circuit that receivers the output current IL and provides an over-current interrupt signal if the output current IL exceeds a current limit that can be enabled in low-power mode.

These and other embodiments are discussed below with respect to the following figures.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
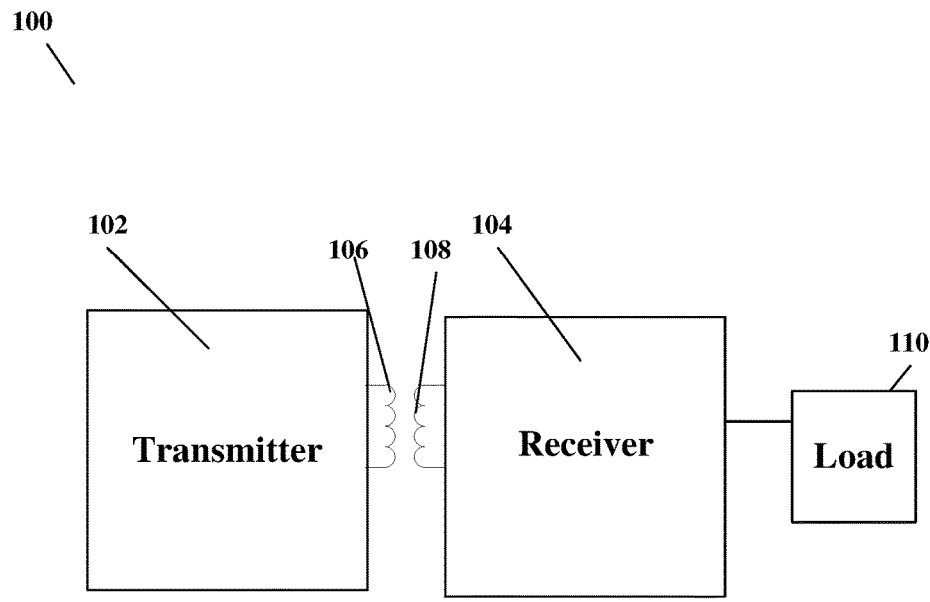
FIG. 1 illustrates a wireless power system with a wireless power receiver according to some embodiments placed proximate to a wireless power transmitter.

FIG. 1 illustrates an example wireless power transmission system 100. As illustrated in FIG. 1, a wireless power transmitter 102 is coupled to drive a transmission coil 106 to produce a time varying magnetic field. The time varying magnetic field induces a current in receive coil 108 of a wireless power receiver 104. As a consequence, wireless power is transmitted between wireless power transmitter 102 and wireless power receiver 104. Wireless power receiver 104 can then provide power to a load device 110, such as a battery charger or other device. Transmitter 102 is typically powered by an external power source, for example a standard AC power output, or may be powered by a DC power source. Receiver 104 typically is powered by the received power and includes rectification and DC-DC circuits to supply power to receiver 104 and to load 110.

Wireless power transmitter 102 and wireless power receiver 104 can adhere to a wireless power transmitter standard. For example, wireless power transmitter 102 and wireless power receiver 104 may adhere to the standard put forth by the Wireless Power Consortium (WPC), the Qi standard. Specific examples of wireless power transmitter 102 and wireless power receiver 104 provided in this disclosure may be Qi compliant. However, embodiments according to the present disclosure may be applicable to any wireless power system 100 for transmitting wireless power between a transmitter and a receiver.

Consequently, in addition to the transfer of power between transmitter 102 and receiver 104, communications can be established between transmitter 102 and receiver 104 by modulating the time-varying magnetic field being transmitted between transmit coil 106 and receiver coil 108. Transmitter 102 can transmit data to receiver 104 using Frequency Shift Keying (FSK) while receiver 104 can transmit data to transmitter 102 using Amplitude Shift Keying (ASK), as is discussed further below. Consequently, data can be transmitted between transmitter 102 and receiver 104 digitally in packet format.

In accordance with embodiments of the present invention, wireless power transmitter 102 and wireless power receiver 104 are transferring high power levels and are high power devices (e.g., 40 W or more). Consequently, according to some embodiments, the output current of wireless power receiver 104 is monitored by a process executed in a process of wireless power receiver 104 and, when an overcurrent condition is detected, an interrupt (INT) is generated resulting in the processor repeatedly sending an End Power Transfer (EPT) packet to transmitter 102. If the EPT signals are unsuccessful in stopping the power transfer, then receiver 104 can repeatedly send Control Error Packets (CEP) to transmitter 102. If that is again unsuccessful, then receiver 104 can limit the output current to load 110 internally to protect the load 110 and receiver 104. In a low-power mode, wireless power receiver can enable a hardware-based over-current detector that generates an OC INT signal.

Figure 2:
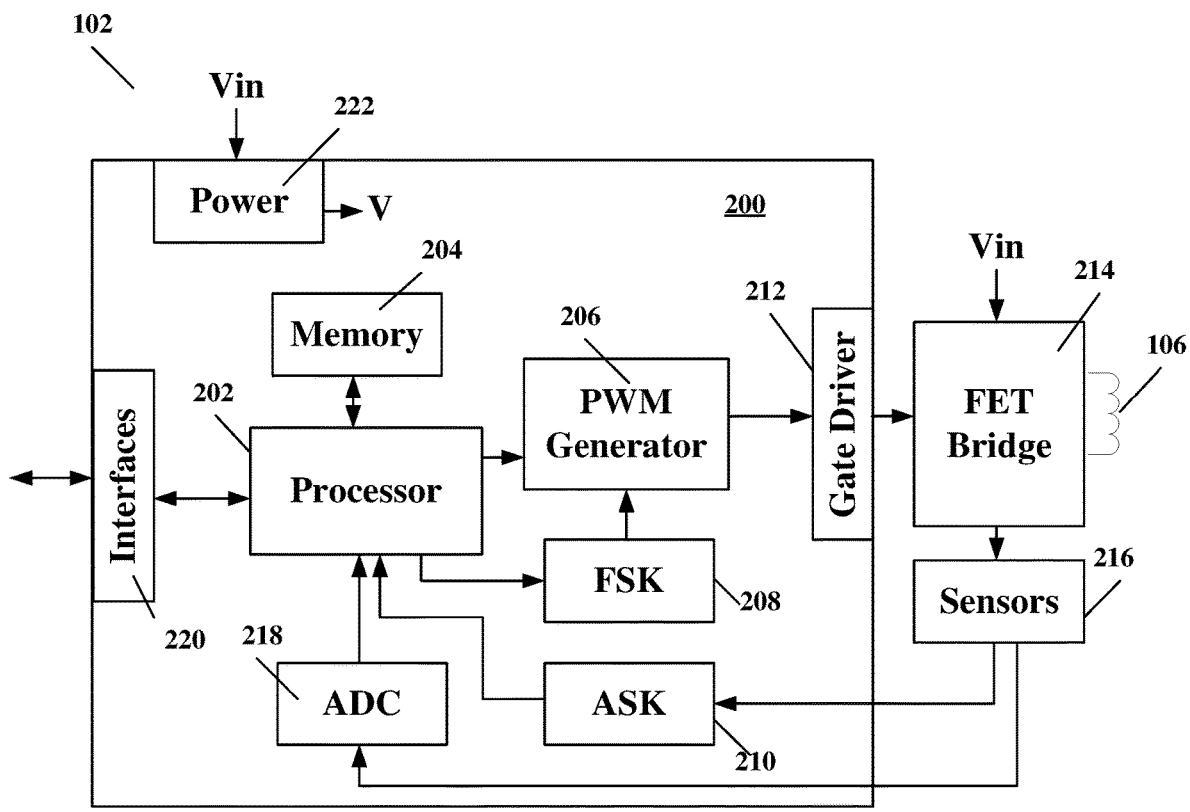
FIG. 2 illustrates an example wireless power transmitter as illustrated in FIG. 1.

FIG. 2 illustrates a typical wireless power transmitter that can be used with some embodiments. Wireless power transmitter 102 includes a processor 202 that is coupled to a memory 204. Processor 202 can be any computing device (including but not limited to a microprocessor, microcomputer, ASIC, or combinations of devices) capable of executing instructions to perform the functions as described in this disclosure. Memory 204 can include both volatile and non-volatile memory for storage of data and instructions that are executed by processor 202. Memory 204 may further include registers for storing operation data for transmitter 102.

Processor 202 is coupled to a pulse-wave modulation generator 206 that provides signals to a gate driver 212 of a particular frequency and duty cycle set by processor 202 to provide sufficient transfer of power. Gate driver 212 drives the gates of FETs in FET bridge 214. FET bridge 214 may be a half-bridge or a full-bridge DC-AC converter to provide AC current through transmission coil 106. FET bridge 214 can be powered with an input voltage Vin. The frequency and duty cycle from PWM generator 206 provided to gate driver 212, along with the input voltage Vin, can in some embodiments be varied by processor 202 to control the output power transmitted from the wireless power transmitter 102.

As is illustrated in FIG. 2, wireless power transmitter 102 can be powered in a power block 222 with an input voltage. In some embodiments, power 222 can provide the voltage to FET bridge 214, although in FIG. 2 the input voltage is also applied to FET bridge 214.

As is further illustrated in FIG. 2, processor 202 may provide digital data to a FSK modulator 208, which modulates the output frequency provided by PWM generator 206 in order to transfer digital data to a wireless power receiver 104.

Additionally, a sensor block 215 may be coupled to FET bridge 214 to monitor peak voltages across transmit coil 106, current through transmit coil 106, temperature, and other operational parameters. The peak voltage from sensors 216 can be provided to an ASK demodulator 210 to demodulate amplitude modulated data received from receiver 104. The digital data can then be provided to processor 202 for further analysis. Other data received by sensor block 216 can be digitized in an analog-to-digital converter 218 and provided to processor 202.

As is further illustrated in FIG. 2, processor 202 may be coupled to transfer data with other devices through interface 220. Interface 220 can, for example, represent GPIO, I2C, USB, or other interfaces for communications between devices or with a user.

As is further illustrated in FIG. 2, processor 202, memory 204, PWM generator 206, FSK modulator 208, ASK demodulator 210, gate driver 212, ADC 218, interfaces 220, and other circuitry may be formed on a single integrated circuit (IC) 200. FET bridge 214, transmit coil 106, and sensors 216 may be external to IC 200.

Figure 3:
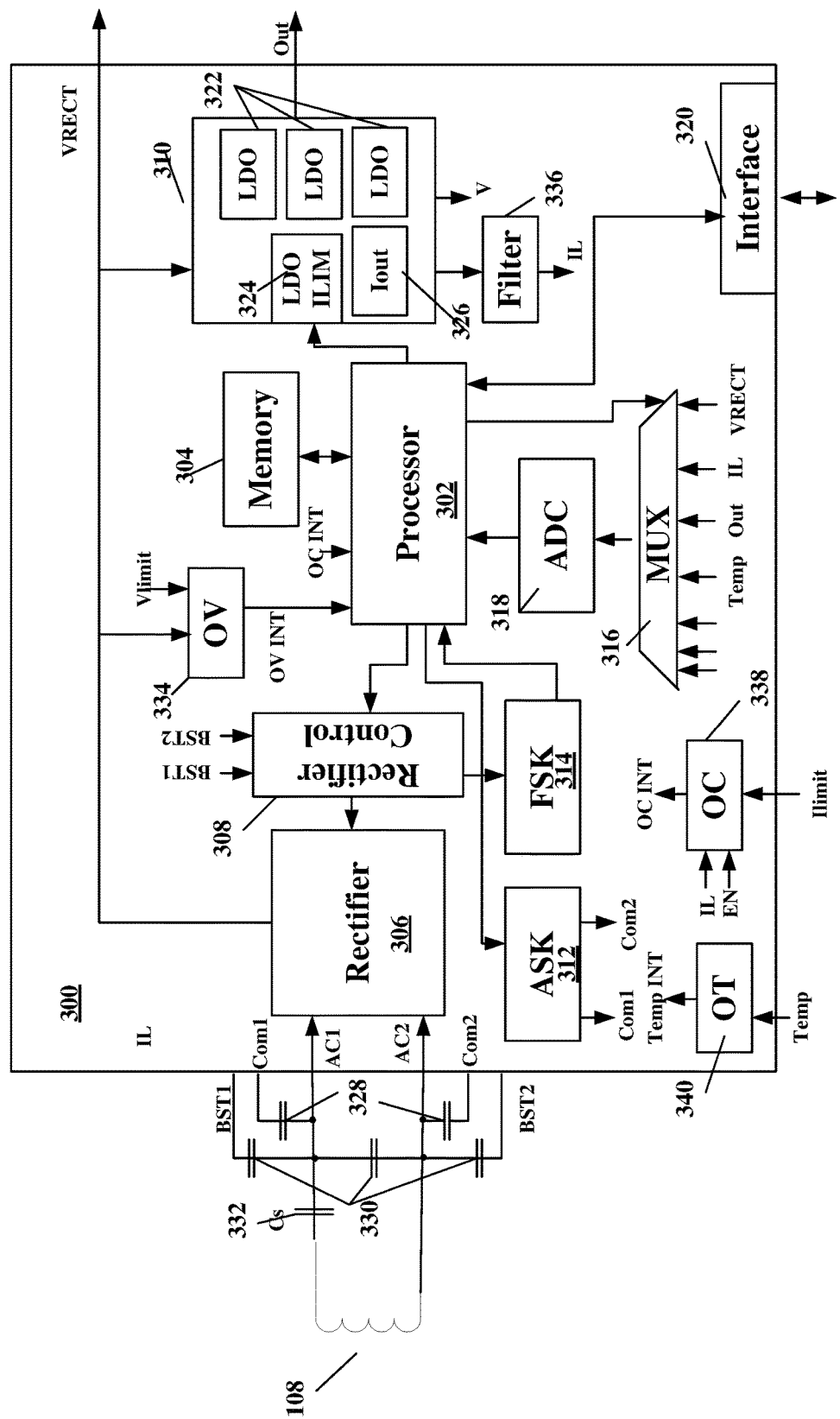
FIG. 3 illustrates an example wireless power receiver according to some embodiments as illustrated in FIG. 1.

FIG. 3 illustrates a wireless power receiver 104 according to some embodiments. Wireless power is received in receive coil 108. An AC voltage across the LC circuit formed by receive coil 108 in series with capacitor 332 is provided between nodes AC1 and AC2. A rectifier 306 is coupled to receive the AC voltage across AC1 and AC2. Rectifier 306 can be a full-bridge or a half-bridge rectifier formed with FET transistors and produces a rectified voltage Vrect from the AC voltage across AC1 and AC2. Rectifier 306 can be controlled by rectifier control 308 according to signals received at nodes BST1 and BST2 that are coupled through capacitors 330 to nodes AC1 and AC2 and in addition to signals from a processor 302. Processor 302 can control rectifier control 308 to efficiently receive power received by receive coil 108.

The rectified voltage VRECT from rectifier 306 is input to a DC-DC power module 310. Power module 310 includes multiple power conversion modules, for example buck or boost circuits, low-dropout regulators (LDOs), filters, or other power circuits that provide for an output voltage OUT. In the example illustrated in FIG. 3, power module 310 includes an array of LDOs 332 that provide various voltage levels V and an output voltage Out, which can be coupled to load 110 as illustrated in FIG. 1. As is further illustrated in FIG. 3, power module 310 includes a current monitoring module 326 that monitors the output current IL on the output voltages and a current limiting module 324 that can limit the output current IL.

As illustrated in FIG. 3, processor 302 is coupled to rectifier control 308 and to power module 310 to control received power and the processed power. Processor 302 is coupled to a memory 304, which stores data and instructions. Processor 302 can be any computing device (including but not limited to microprocessors, microcomputers, ASICs, or combinations of such devices) capable of executing instructions to perform the functions as described in this disclosure. Memory 304 can include both volatile and non-volatile memory for storage of data and instructions that are executed by processor 302. Memory 304 may further include registers that set operational data parameters for operation of receiver 104.

Processor 302 is further coupled to an FSK demodulator 314. FSK demodulator 314 is coupled to rectifier control and receives a frequency signal, which is demodulated to produce digital data that can provided to processor 302.

Further, processor 302 is coupled to ASK modulator 312. ASK modulator 312 amplitude modulates the wireless power signal received at receive coil 108 by modulating a load on the wireless power signal. As is illustrated in FIG. 3, for example, ASK modulator 312 is coupled to activate or deactivate capacitors 328 coupled to AC1 and AC2 to provide additional loading to the wireless power received by receive coil 108.

Consequently, digital data as a sequence of "1"s and "0"s are transmitted between wireless power transmitter 102 and wireless power receiver 104 using the modulations discussed above. In some embodiments, data is transmitted between transmitter 102 and receiver 104 in accordance with a standard, for example the Qi standard above, although a custom format may be used. As an example, the Qi packet format will be discussed hear, although embodiments of the present invention may be used with other standards. The packet format can be as follows:

| Preamble | Header | Message | Checksum |
| --- | --- | --- | --- |

The preamble consists of between 11 and 25 bits, all set to "1", which allows for synchronization of incoming data and allows for accurate detection of the start bit of the header. The header is a single byte (8 bits) of data that identifies the type of packet being transmitted. Although multiple packet types are identified in the Qi standard, for purposes of this disclosure the End Power Transfer (EPT) and the Control Error Packet (CEP) are discussed. In the Qi standard, the EPT packet is identified with a header value of "0x02" while a CEP packet is identified with a header value of "0x03".

The EPT packet is transmitted from wireless power receiver 104 to wireless power transmitter 102 to halt the transmission of wireless power. Consequently, when wireless power transmitter receives an EPT packet, it stops transmitting power and may enter a standby state. The message size for an EPT packet is 1 byte, which is commonly used to provide a reason for the power to halt. Common reasons include charge complete (0x01), internal fault ("0x02"), over temperature ("0x03"), over voltage ("0x04"), over current ("0x05"), battery failure ("0x06"), or other message as identified in the Qi standard.

The CEP packet is also transmitted from wireless power receiver 104 to wireless power transmitter 102 to adjust the power level transmitted by wireless power transmitter 102. The message size for a CEP packet is 1 byte and includes a value between −128 and 127 that determines adjustment (up or down) of the current power level.

With further reference to FIG. 3, wireless power receiver 104 can include an over-voltage (OV) detector 334, an over temperature (OT) detector 340, and an over-current (OC) detector 338. OV detector 334 compares the rectifier voltage VRECT with a threshold voltage Vlimit and can provide an interrupt signal if VRECT exceeds the value of Vlimit. In some embodiments, OV detector 334 may create the OV INT signal when VRECT exceeds the value of Vlimit for a predetermined time.

Power module 310 can measuring the output current in Tout block 326 and provides an IL signal that indicates the output current. In some embodiments, the output current can be filtered through a filter 336 to provide the IL signal. OC 338 represents a hardware (HW) over-current detection block. OC 338 compares the current signal IL with a threshold current limit value and can provide an OC interrupt signal (OC INT) to processor 302 when IL exceeds Ilimit. In some embodiments, the OC INT signal is generated when IL exceeds Ilimit for a predetermined time.

OT detector 340 determines temperature at some point in wireless receiver 104. OT 340 receives a temperature signal from a temperature signal (not shown) and produces a temperature interrupt signal to processor 302 if the temperature exceeds a determined temperature value.

Processor 302 is also coupled to receive measured signals, including the current signal IL. As is illustrated in FIG. 3, various analog signals can be input to a multiplexer (MUX) 316 and processed through an analog-to-digital converter 318 to provide digital representations of the analog signal to processor 302. In the example of FIG. 3, MUX 316 receives Vrect, IL, the output voltage Out, a temperature signal, and various other analog signals. Processor 302 determines which of these analog signals is provided to ADC 318 by sending a signal to MUX 316. ADC 318 has sufficient resolution to provide digital data that is usable by algorithms being executed in processor 302.

Processor 302 can also be coupled to an interface block 320. Interface block 320 can provide interfaces under any standard, for example GPIO, I2C, USB, ethernet, or other standard protocols. As such, operational parameters and data can be uploaded to memory 304 and used in operation of wireless power receiver 104.

As is further illustrated in FIG. 3, many components of wireless power receiver 104 can be formed on a single receiver chip 300. In particular, as shown in FIG. 3, all of the discussed components except for receive coil 108, capacitors 330, and capacitors 328 can be formed on IC 300.

Using a hardware OC detector 338 for over-current detection and control may be appropriate for lower power systems. Consequently, in low power systems, when OC detector 338 sends an OC INT signal to processor 302, processor 302 can then take steps to limit the current in LDO Ilim 324 of power block 310 or by sending an CEP packet to reduce power. However, in high power systems, use of a hardware based over-current detection system becomes less desirable. In particular, the higher currents can create damage very quickly. However, for low-power usages, hardware OC detector 338 can be enabled.

Embodiments of the present disclosure provide for a non-hardware over-current detector for high-power operation. In that case, OC detector 338 can be disabled and over-current detection is implemented in instructions executed by processor 302, enabling the software OC process. Switching between a hardware over-current protection using OC detector 338 used for low power operation and a non-hardware, or software based, over-current protection for high-power operation can be determined by setting a value in a register of memory 304 or by determining between a low-power mode and a high-power mode from comparison of the output current IL with a transition value held in memory 304. As has been discussed above, the mode flag or the transition value may be set through interface 320 by an external user.

Figure 4A:
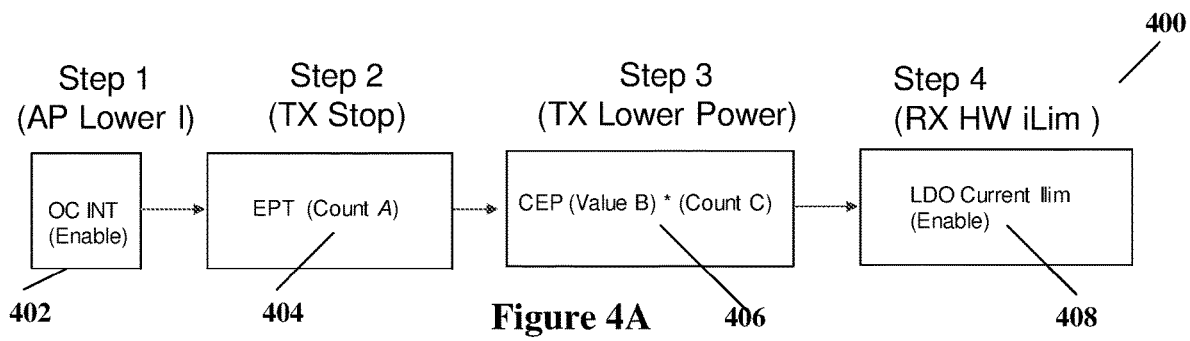
FIG. 4A illustrates a state diagram according to some embodiments that can operate on the wireless power transmitter as illustrated in FIG. 3.

FIG. 4A illustrates an over-current protection process 400 according to some embodiments of the present disclosure. As illustrated in FIG. 4A, in step 402 a software generated over-current interrupt (OC INT) can be generated in processor 302 when the output current IL, as digitized in ADC 318, exceeds a current limit value ILIM. In some embodiments, a filter can also be implemented in step 402 to prevent false over-current detection in processor 302. The current limit value ILIM used in step 402 can be set by input values loaded through interface 320. When the OC INT is generated in step 402, process 400 proceeds to step 404. In step 404 processor 302 transmits an EPT packet for a count of A. Consequently, A occurrences of an EPT packet indicating an over-current condition are transmitted. It should be noted that A can be set to 0, where no EPT packets are transmitted in response to the OC INT generated in step 402. Alternatively, A can be set to FFh, in which case the EPT packets are transmitted repeatedly without end. A can be any number and may have a default value, for example A=2. If wireless power transmitter 102 has not shut the power off (or A is set to 0), then process 400 proceeds to step 406.

In step 406, in response to an OC INT generated in step 402 or failure of response to EPT packets sent in step 404, a count C number of CEP packets with value B is sent. Value B can be a negative value up to −128, as discussed above. Count C can be any number from 0 (disabled) to FFh (repeatedly transmitted). Count C can have a default value of 2. Value B can also have a default value, for example −20.

If step 406 is again unsuccessful in reducing the power transmitted to wireless power receiver 106, then process 400 proceeds to step 408. In step 408, processor 302 enables the LDO ILIM block 324 in power block 310 to limit the output current from power block 310.

As discussed above, several parameters can be set as operational parameters through interface 320. In particular, as discussed above Count A can be set between 0 and FFh with A=0 disabling EPT transmission and A=FFh providing an indefinite number of EPT transmissions. Count A may have a default value, for example A=2. Further, Count C can be set between 0 and FFh with C=0 disabling transmission of a CEP while C=FFh can indicating transmission of an indefinite number of CEP transmissions. Value B can be set to any negative value (−128 to 0) with a default value, for example B=−20.

Figure 4B:
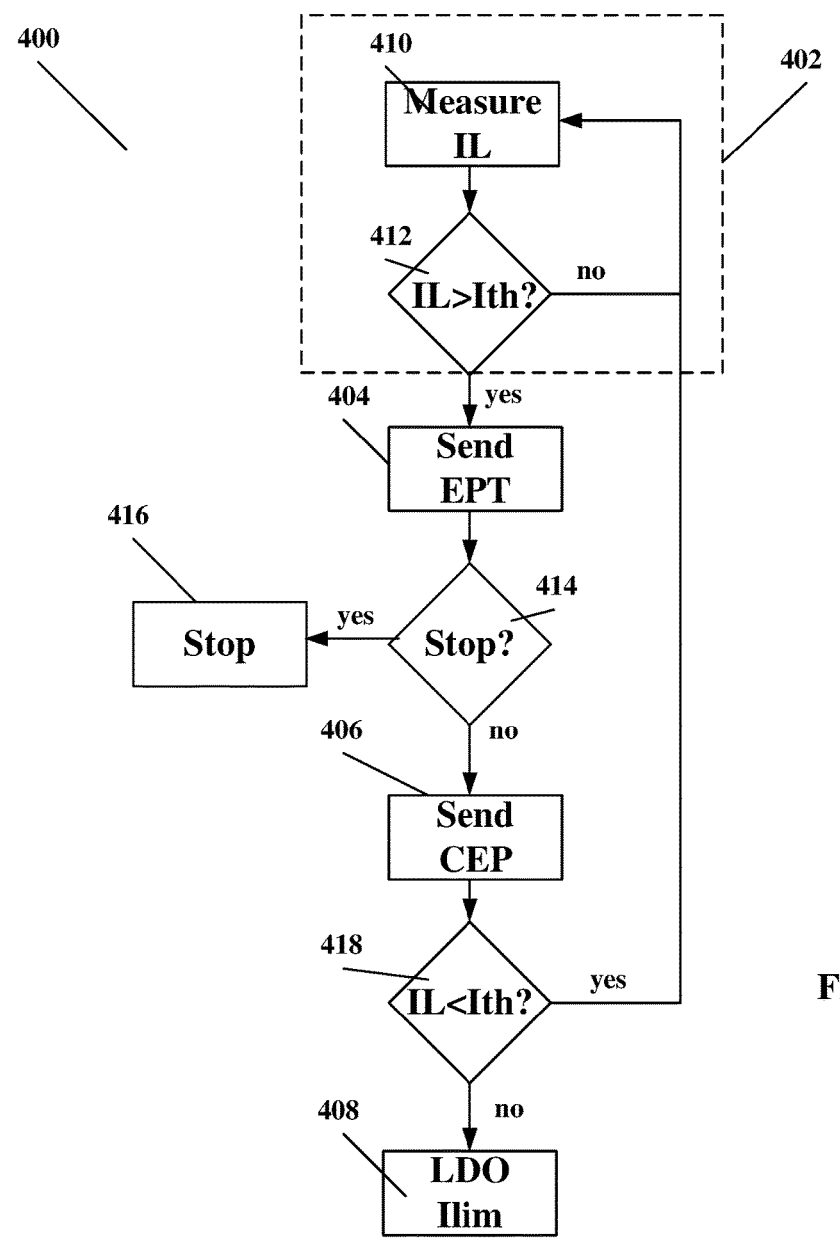
FIG. 4B illustrates a flow chart further detailing the state diagram as illustrated in FIG. 4A.

FIG. 4B further illustrates details of process 400 according to some embodiments. As is illustrated in FIG. 4B, step 402 includes step 410 and step 412. In step 410, processor 302 measures the output current IL. In step 410, processor 302 further executes a software filter in step 410. In step 412, processor 302 compares the current IL with a limit threshold current Ith, which can be set during initiation of wireless power system 104. If IL is less than the threshold current Ith, then processor 302 proceeds to step 410 to continue measuring IL.

If IL is greater than Ith, generating an OC INT signal, then processor 302 proceeds to step 404 when Count A number of EPT packets are transmitted, as discussed above. After which, processor 302 proceeds to step 414.

In step 414, if transmission of wireless power is stopped, then processor 302 proceeds to step 416 where the over-current process 400 is stopped. If wireless power transmission has not stopped, then, processor 302 proceeds to step 406 where Count C number of CEP packets with Value B are transmitted as discussed above. Processor 302 then proceeds to step 418, where processor 302 checks to see if IL<Ith. If it is, then processor 302 returns to step 410. If it is not, then processor 302 proceeds to step 408. In step 408, processor 302 enables the LDO ILIM 324 to enable a current limit in power block 310.

As discussed above, the transition between low-power mode and high-power mode may be set at different power levels, depending on the implementation. In some embodiments, a register may be set to determine operation in low-power mode or high-power mode, making the determination a user-settable parameter. In some embodiments, processor 302 may transition from low-power mode to high-power mode depending on the value of IL. The transition value, over which wireless power receiver 104 operates in high-power mode, may be settable by a user through interface 320.

In some examples of the present invention, the output voltage may be about 20V. When the output current IL is less than 2 A, then wireless power receiver 104 can operate in low-power mode with a hardware over-current detector 338. When the output current IL is higher than 2 A, then wireless power receiver operates in high power mode by implementation of the software-based over-current process 400 illustrated in FIGS. 4A and 4B.

In one specific example where embodiments of the present disclosure are implemented, wireless power transmitter 102 can include an IDT (now Renesas) P9247 transmitter IC with a quick-charge (QC) 3.0 Adapter. The input voltage Vin to wireless power transmitter 102 was 19.4V. Wireless power receiver 104 included an IDT (now Renesas) P9415 Rev. G wireless receiver chip implemented embodiments of the present disclosure. Receive coil 108 was a 9 µH receive coil. The Ilim function was disabled provided by LDO ILIM 324 was disabled. The RX output voltage was 20V and the output current IL was 2.3 A, resulting in a total output power of 46 W. An evaluation kit (EVK) board of size 62 mm×0.76 mm with 4 layers can be used to mount wireless power transmitter 102 and wireless power receiver 104. The wireless power transmission system was then placed in a chamber with chamber temperature of 55° C. and die temperature of 110° C.

In a close loop bench aging test of a transmitter/receiver system at 40 W which passed after 7 days of testing. The following table illustrates the efficiencies and surface temperatures of the system during the testing under the above conditions:

| Vbridge (V) | Iin (A) | Vout (V) | Iout (A) | Pin (W) | Pout (W) | Eff % | temp. [ambient: 23' C.] |
|---|---|---|---|---|---|---|---|
| 17.679 | 2.57 | 19.88 | 2 | 45.44 | 39.76 | 87.5% | 67.8 |

The following table illustrates the Iout ADC readings during the test.

| Iout load | 2A | 2.3A | 2.5A | 2.8A | 2.9A |
|---|---|---|---|---|---|
| ADC reading | 2.015A | 2.342A | 2.547A | 2.831A | 2.966A |

The 20V/2.3 A close loop system is functional (i.e. rectifier, main LDO, etc.). OV detector 334 and OT detector 340 were functional. OC detection was performed in high-power mode as illustrated in FIGS. 4A and 4B. Voltage control and frequency controls were functional. The testing includes system protection for 40 W (implementing the system proposal).

During the test, the chip-scale package (CSP) for the wireless power receiver IC 300, IDT P9415 receiver, was analyzed at greater than 40 W of received power. Resistive 3D (R3D) simulations were performed to analyze the current density of the existing silicon at the RDL layer, the metal layers, and the balls. The RDL layer is good in rectifier and MLDO up to an output current of 4.5 A. Having limitations in metal5 of the rectifier when there is 2.8 A DC current passing helps. MLDO is good up to 3 A DC current. MLDO is also limited with metal5 at 3 A. At 2.2 A load current (1.1 A average current in rectifier); there is 0.7 A at AC24 and AC11 balls, 1 A at PGND2 and PGND4 balls and 0.8 A at OUT1 ball. Ardmore metals and balls are okay to use with load currents up to 3 A.

The above detailed description is provided to illustrate specific embodiments of the present invention and is not intended to be limiting. Numerous variations and modifications within the scope of the present invention are possible. The present invention is set forth in the following claims.

What is claimed is:

1. A method of over-current protection in a wireless power receiver, comprising:
   in a high-power mode,
      receiving a digitized output current signal from an analog-to-digital converter that receives and digitizes an output current of a rectifier of the wireless power receiver to provide the digitized output current signal;
      comparing the digitized output current signal with a current limit value;
      generating an over-current interrupt (OC INT) signal if the digitized output current signal is greater than the current limit value;
      if the OC INT signal is not generated, then returning to receiving the digitized output current signal; and
      if the OC INT signal is generated,
         transmitting Count A number of End Power Transfer (EPT) packets to a wireless power transmitter, then
         determining whether wireless power transmission has stopped,
         if the wireless power transmission has stopped, then stop,
         if the wireless power transmission has not stopped, transmitting Count C number of Control Error Packets (CEPs) with value B to the wireless power transmitter, and
         if wireless power transmission has not reduced such that the output current IL is below the current limit value, then enabling an low-dropout regulator (LDO) current limit circuit in a power block of the wireless power receiver.

2. The method of claim 1, wherein Count A is a value between 0 and FFh, wherein a value A=0 disables transmission of EPT packets and a hexadecimal value A=FFh indicates repeated transmissions of the EPT packets.

3. The method of claim 1, wherein Count A is set to a A default value.

4. The method of claim 1, wherein Count A is set by a user input to the wireless power receiver.

5. The method of claim 1, wherein Count C is a value between 0 and hexadecimal FFh wherein a value of C=0 disables transmission of CEPs and a hexadecimal value of A=FFh indicates repeated transmission of CEPs.

6. The method of claim 1, wherein Count C is set to a C default value.

7. The method of claim 1, wherein Count C is set by a user input to the wireless power receiver.

8. The method of claim 1, wherein Value B is a number between −128 and 0.

9. The method of claim 1, wherein Value B is set to a B default value.

10. The method of claim 1, wherein Value B is set by a user input to the wireless power receiver.

11. The method of claim 1, wherein in a low-power mode the wireless power receiver enables a hardware over-current circuit that generates an OC INT signal when the output current exceeds a current limit.

12. The method of claim 11, wherein the wireless power receiver operates in low-power mode or in high-power mode according to a user input parameter.

13. The method of claim 11, wherein the wireless power receiver operates in low power mode or in high power mode according to whether the output current is above or below a transition value.

14. The method of claim 13, wherein the transition value is set by a user input to the wireless power receiver.

15. A wireless power receiver, comprising:
   a rectifier receiving power from a receiver coil and producing a rectified voltage, the receiver coil configured to receive power from a wireless power transmitter;
   a power block coupled to receive the rectified voltage and provide an output voltage, the power block further providing an output current IL;
   a low-dropout regulator (LDO) limit circuit in the power block;
   an amplitude shift key (ASK) modulator coupled to transmit digital data packets to the wireless power transmitter on the power on the receiver coil;
   an analog-to-digital converter coupled to provide a digitized output current IL from the output current IL; and
   a processor coupled to control the rectifier and the power block, coupled to transmit data packets through the ASK modulator, and coupled to receive the digitized output current IL, the processor executing instructions to, in a high-power mode,
      repeatedly compare the digitized output current IL with a current limit value,
      while repeatedly comparing, generate an over-current interrupt (OC INT) signal if the digital output current signal is greater than the current limit value and subsequently performing the following steps when the OC INT signal is generated:
      transmit Count A number of End Power Transfer (EPT) packets to wireless power transmitter if the OC INT signal is generated,
      after Count A EPT packets have been transmitted, stop if it is determined that wireless power transmission has stopped,
      transmit Count C number of Control Error Packets (CEPs) with Value B to the wireless power transmitter if it is determined that wireless power transmission has not stopped, and
      enable the LDO current limit circuit in a power block of the wireless power receiver if wireless power transmission has not reduced such that the output current IL is below the current limit value.

16. The wireless power receiver of claim 15, wherein Count A is a value between 0 and hexadecimal FFh, wherein a value A=0 disables transmission of EPT packets and a value A=hexadecimal FFh indicates repeated transmissions of the EPT packets.

17. The wireless power receiver of claim 15, wherein Count A is set to a A default value.

18. The wireless power receiver of claim 15, further including an interface coupled to the processor and wherein Count A is set by a user input to the wireless power receiver.

19. The wireless power receiver of claim 15, wherein Count C is a value between 0 and hexadecimal FFh wherein a value of C=0 disables transmission of CEPs and a value of A=hexadecimal FFh indicates repeated transmission of CEPs.

20. The wireless power receiver of claim 15, wherein Count C is set to a C default value.

21. The wireless power receiver of claim 15, further including an interface coupled to the processor and wherein Count C is set by a user input to the wireless power receiver.

22. The wireless power receiver of claim 15, wherein Value B is a number between −128 and 0.

23. The wireless power receiver of claim 15, wherein Value B is set to a B default value.

24. The wireless power receiver of claim 15, further including an interface coupled to the processor and wherein Value B is set by a user input to the wireless power receiver.

25. The wireless power receiver of claim 15, further including a hardware over-current circuit that receivers the output current IL and provides an over-current interrupt signal if the output current IL exceeds a current limit and wherein the processor executes instructions to
   disable the hardware over-current circuit in high-power mode; and
   enable the hardware over-current circuit in a low-power mode.

26. The wireless power receiver of claim 25, further including an interface coupled to the processor and wherein the wireless power receiver operates in low-power mode or in high-power mode according to a user input parameter.

27. The wireless power receiver of claim 25, wherein the process executes instructions to operate in low power mode or operate in high power mode according to whether the output current IL is above or below a transition value.

* * * * *